United States Patent [19]
King et al.

[11] Patent Number: 5,710,413
[45] Date of Patent: Jan. 20, 1998

[54] H-FIELD ELECTROMAGNETIC HEATING SYSTEM FOR FUSION BONDING

[75] Inventors: James D. King; Harold F. Donoho, Jr., both of San Antonio, Tex.

[73] Assignee: Minnesota Mining and Manufacturing Company, St. Paul, Minn.

[21] Appl. No.: 413,119

[22] Filed: Mar. 29, 1995

[51] Int. Cl.⁶ .................................................. H05B 6/10
[52] U.S. Cl. .................... 219/633; 219/634; 219/765; 219/690; 219/656; 219/759; 219/748; 156/272.4; 156/379.6
[58] Field of Search ........................ 219/633, 634, 219/765, 780, 690, 691, 693, 695, 759, 656, 662, 665, 676, 748; 156/272.4, 379.6, 272.2

[56] References Cited

U.S. PATENT DOCUMENTS

| | | | |
|---|---|---|---|
| 2,393,541 | 1/1946 | Kohler | 20/0.5 |
| 2,562,911 | 8/1951 | Hare | 219/691 |
| 2,563,098 | 8/1951 | Brown | 219/765 |
| 2,608,637 | 8/1952 | Dakin et al. | 219/690 |
| 3,143,364 | 8/1964 | Klein | 285/55 |
| 3,574,031 | 4/1971 | Heller, Jr. | 156/273 |
| 3,607,063 | 9/1971 | Douglas et al. | 219/770 |
| 3,620,875 | 11/1971 | Gugliamo et al. | 156/272 |

(List continued on next page.)

FOREIGN PATENT DOCUMENTS

| | | | |
|---|---|---|---|
| 1237970 | 6/1988 | Canada | 154/107.2 |
| 0 399 599 | 11/1990 | European Pat. Off. | |
| 399599 | 11/1990 | European Pat. Off. | B29C 65/10 |
| 503794 | 9/1992 | European Pat. Off. | C08K 9/00 |
| 2 128 935 | 10/1972 | France | |
| 2 490 057 | 3/1982 | France | 219/765 |
| 54-58777 | 5/1979 | Japan | B29C 27/00 |
| 54-121443 | 9/1979 | Japan | 219/693 |
| PCT/GB80/ 00062 | 10/1980 | WIPO | B29C 27/04 |
| PCT/US88/ 02909 | 6/1989 | WIPO | B32B 31/00 |
| PCT/CA93/ 00363 | 3/1994 | WIPO | B29C 65/34 |

OTHER PUBLICATIONS

Article entitled "Litz Wire Boosts Induction Heater's Efficiency", by Design News, pp. 109–110, dated Sep. 26, 1994.

*Primary Examiner*—Philip H. Leung
*Attorney, Agent, or Firm*—Gerald F. Chernivec; John C. McFarren

[57] ABSTRACT

An H-field electromagnetic heating system for fusion bonding, particularly useful in the sealing of telecommunications cables and closures, comprises a composite bonding material having a bonding matrix and susceptors, the susceptors being magnetically reactive at a frequency above 50 MHz, and an applicator for applying radiant electromagnetic energy to the composite bonding material, at a frequency above 50 MHz (preferably 75–500 MHz). The applicator may take the form of a quarter-wave resonator having an inner conductor and an outer conductor which at least partially surrounds the inner conductor, the two conductors being shorted at a common end. The material to be heated is placed between the conductors. The inner conductor may include a resonator tube which is capacitively coupled to the power supply by a capacitive probe connected to the center conductor of a coaxial connector. Different applicators (having different geometries) may be used with the same power supply, or a variety of heater adapters may be provided which can be removably attached to the applicator base. An alternative applicator employs many wires, electrically insulated from one another, each forming a coil with a common axis, and all of the wires being electrically connected in parallel. Several of these wires are stacked to form multiple layers of coils, such that the effective resistance of said applicator is reduced and the current-carrying capacity is increased. Individual capacitors may be connected in series with a respective one of the wire coils, to make the current in the coils more uniform for coil circumferences which are greater than 0.1 of the wavelength of the radiant electromagnetic energy.

14 Claims, 5 Drawing Sheets

U.S. PATENT DOCUMENTS

| | | | |
|---|---|---|---|
| 3,657,038 | 4/1972 | Lightfoot | 156/106 |
| 3,709,775 | 1/1973 | James | 161/162 |
| 3,730,804 | 5/1973 | Dickey | 156/272 |
| 3,802,985 | 4/1974 | Leatherman | 156/244 |
| 3,989,916 | 11/1976 | Amagami et al. | 219/624 |
| 3,996,090 | 12/1976 | Leatherman | 156/244 |
| 4,018,642 | 4/1977 | Pike et al. | 219/693 |
| 4,067,765 | 1/1978 | Heller, Jr. et al. | 156/272 |
| 4,095,044 | 6/1978 | Horsma et al. | 174/138 |
| 4,197,851 | 4/1980 | Fellus | 219/748 |
| 4,446,874 | 5/1984 | Vaguine | 128/804 |
| 4,585,916 | 4/1986 | Rich | 219/676 |
| 4,617,440 | 10/1986 | Gics | 219/10.55 |
| 4,659,892 | 4/1987 | Hammond et al. | 219/656 |
| 4,749,833 | 6/1988 | Neversky et al. | 219/10.43 |
| 4,762,864 | 8/1988 | Goel et al. | 523/428 |
| 4,792,374 | 12/1988 | Rianda | 156/503 |
| 4,810,829 | 3/1989 | Rutenbeck et al. | 174/41 |
| 4,947,102 | 8/1990 | Minarovic | 219/535 |
| 5,123,989 | 6/1992 | Horiishi et al. | 156/272.4 |
| 5,125,690 | 6/1992 | Taylor et al. | 285/21 |
| 5,148,172 | 9/1992 | Kumurdjian | 342/1 |
| 5,169,713 | 12/1992 | Kumurdjian | 428/323 |
| 5,245,151 | 9/1993 | Chamberlain et al. | 219/10.57 |
| 5,248,864 | 9/1993 | Kodokian | 219/634 |
| 5,254,824 | 10/1993 | Chamberlain et al. | 219/10.57 |
| 5,313,037 | 5/1994 | Hansen et al. | 219/632 |
| 5,338,611 | 8/1994 | Lause et al. | 428/412 |

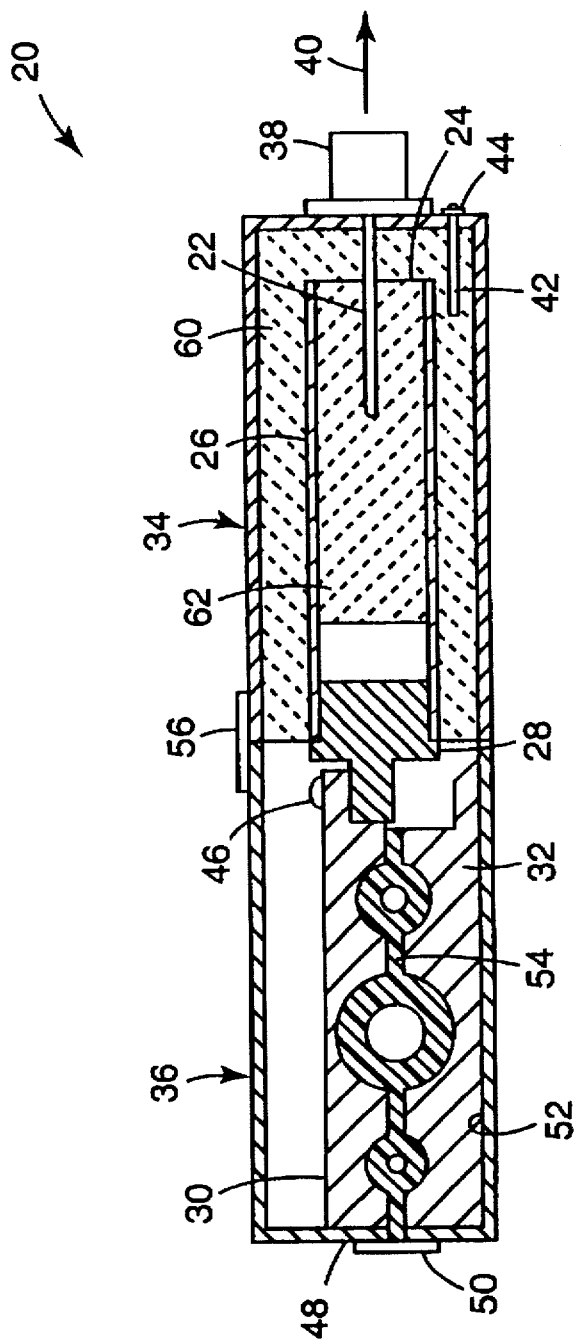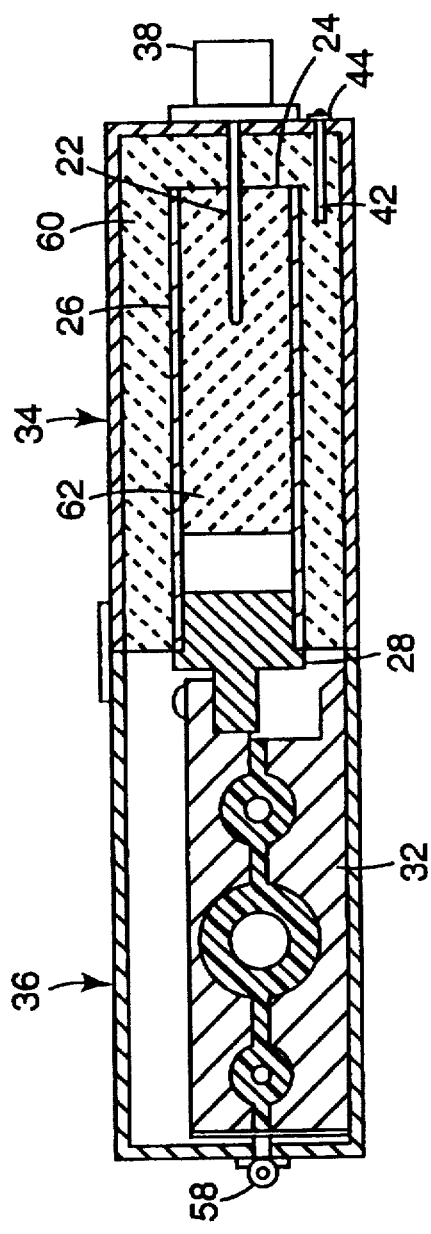
FIG. 3A
FIG. 3B

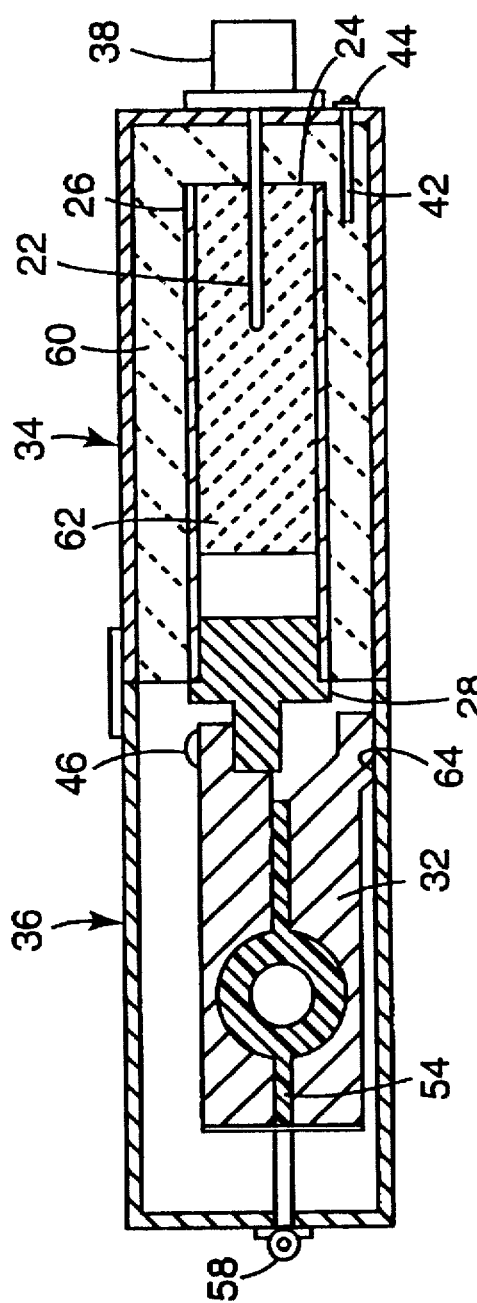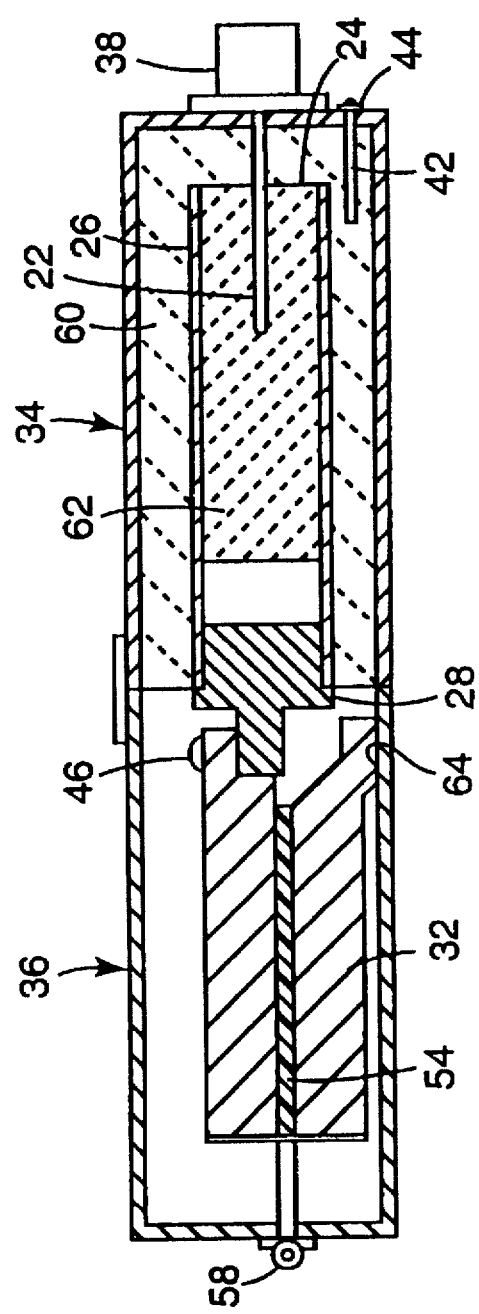

H-FIELD ELECTROMAGNETIC HEATING SYSTEM FOR FUSION BONDING

BACKGROUND OF THE INVENTION

1. Field of the Invention

The present invention generally relates to fusion bonding of thermoplastic materials such as polyolefins by heating them, and more particularly to a method and apparatus for applying electromagnetic energy to a material having energy susceptors therein so as to heat the material. The present invention is especially useful in the bonding of polyethylene cables and duct, such as is used in the telecommunications industry.

2. Description of the Prior Art

The present invention relates to a method and apparatus for joining, repairing or sealing the insulating covers of cables and ducts, such as those used for telecommunications, including cables of copper wires or optical fibers. When two or more cable ends are joined together, for example when extending a cable, tapping into an existing cable, or repairing a severed cable, a splice or splice area is created. Generally, it is necessary to provide a closure for such splices to protect the splice against harmful environmental influences, regardless of whether the cable is, e.g., aerial or buried.

One persistent problem in the use of splice closures involves the need for a complete seal about the splice. Many prior art splice closures accomplish sealing by providing a complex array of nuts and bolts, clamps, gaskets and heat shrink (thermoelastic) tubing, as well as potting gels and resins, in various combinations. Besides the fact that these closure methods require significant assembly time, the closures still often suffer leaks or ruptures, particularly along their seals. This problem is even more acute at the sealing of the closure to the cable jacket (the outermost layer of the cable), where even the slightest defect can result in the migration of moisture along the jacket or the inner surface of the closure. Such moisture progresses into the splice area and adversely affects the electrical connections therein, often even when heat shrink tubing is used, since such tubing provides at best a weak adhesive bond to the cable jacket. The use of heat shrink tubing in the construction of splice closures is further limited by the usual requirement of an open flame, which in many cases (e.g., splices in trenches or manholes) can be very dangerous due to the possible presence of explosive gases.

Leakage at seals may be somewhat reduced by the use of special closure designs such as so-called clamshell designs which include a hinge integrally molded with the top and bottom halves of the closure. One such exemplary closure is illustrated in U.S. Pat. No. 4,810,829, which is referred to as a SLiC splice closure (SLiC is a trademark of Minnesota Mining and Manufacturing Co.). Nevertheless, moisture migration is still possible along the longitudinal seal of such a closure, as well as at the end caps or seals to the cable jacket. A lack of a complete (hermetic) seal can also be particularly detrimental for pressurized closures.

Although these seals may be strengthened by the use of adhesives, the adhesive bonds formed are relatively weak due to the low surface energy of the material of the closures and cables, typically polyethylene. U.S. Pat. No. 3, 143,364 discusses the great difficulty in bonding nearly anything to polyethylene. An alternative technique for sealing thermoplastic polymers such as polyethylene is that of fusion bonding. This technique generally involves the heating of the material until it becomes molten at its sealing surfaces, causing it to flow together at the interfaces, and can be used for butt welds, coupling joints and repair sleeves. There are four specific methods of fusion bonding: (i) direct heating, (ii) microwave heating, (iii) dielectric heating, and (iv) H-field electromagnetic heating (sometimes herein referred to as "induction heating") . These various heating methods may also be used to activate thermoset and thermoplastic (hot-melt) adhesives, as well as thermoelastic (heat-shrink) tubing.

In direct heating, heat is applied to the thermoplastic article to be bonded by directly attaching heating elements to the article. Current flowing through the elements heats them up. The current is supplied by a power source directly connected to the elements, but the heating is not very efficient. One advantage of such a system is that is does not involve emission of radiation, but there are still safety issues with the use of hard-wired current sources, and there are disadvantages such as non-uniform heating of the material. Examples of direct heating for sealing cables, pipes or closures are shown in U.S. Pat. Nos. 4,095,044, 4,792,374, and 4,947,012, and Patent Cooperation Treaty Application Nos. WO 89/05230, WO 90/06010 and WO 94/05485.

In microwave heating, depending upon the materials used, radiant microwave energy may heat the material by dielectric polarization, hysteresis heating and/or resistive heating. The former of these mechanisms is powered by the electric portion of the field (the "E" field) in the microwave signal, while the latter two mechanisms are powered by the magnetic portion of the field (the "H" field). The bonding of cables and pipes using a composite bonding material (CBM) having microwave susceptors is disclosed in U.S. Pat. Nos. 5,245,151 and 5,254,824. Microwave heating generally involves signals in the range of 1 to 300 GHz, although European Patent Application No. 399,599 discusses applying microwave radiation having a frequency of at least 433 MHz.

Dielectric heating is also well known, and requires two plates or electrodes which create a varying electric potential (voltage) around or through the body to be heated. With dielectric heating, there is only E field interaction, i.e., there are no induced eddy currents or hysteresis loss. Heating occurs through dielectric loss or absorptive mechanisms such as may occur by perturbation of the electrons in the atoms or molecules (inducing a dipole moment), and by dielectric polarization if the material has polar molecules. A polar molecule (e.g., water) is not necessarily magnetically reactive. Japanese Patent Application (Kokai) No. 54-58777 describes the use of dielectric heating to connect polyolefin pipes. Canadian Patent No. 1,237,970 notes that dielectric and induction heating techniques may be combined.

Induction heating has been widely used to seal and bond polymeric materials. A composite bonding material is formed by dispersing magnetically reactive susceptors in a thermoplastic carrier which is compatible (miscible) with the thermoplastic bodies to be welded. When this material is placed in an alternating electromagnetic field, the H field induces heating in the magnetic material. Heating may be caused by one of two effects: hysteresis loss, or resistive loss from induced eddy currents. The E field does not interact with the magnetic particles. The following list of U. S. patents is representative of a wide variety of induction techniques used to heat adhesives and composite bonding matrices, in order to join thermoplastic materials such as polyethylene:

U.S. Patent Nos. 2,393,541 3,574,031 3,620,875 3,657,038 3,709,775 3,730,804 3,802,985 3,996,090 4,067,765 4,749,833 4,762,864 5,123,989 5,125,690

These patents describe a variety of susceptor materials, including iron oxide (ferrous and ferric), ferrite powder (e.g., barium ferrite), other metals and metal oxides including chromium, manganese, nickel, cobalt, stainless steel, alloys of aluminum, silicon, copper, silver and gold, and carbon powder (graphite). These materials may be coated on inert particles, that is, a susceptor substrate which is transparent or non-reactive to radio frequencies, including substrates such as glass beads or mica flakes. The susceptors may be circular, irregular shaped, or formed into fibers, wires, strips, threads, fabric or screening.

The alternating electromagnetic field which is used in these induction heating techniques has a frequency which is typically in the range of 4–30 MHz. The '989 patent describes induction heating with a frequency as low as 1 kHz. Leatherman, in the '090, '765 and '985 patents, suggests that the frequency may vary from 450 kHz to 5 GHz, but no explanation is given on how to achieve efficient energy conversion at such high frequencies. Indeed, Leatherman only teaches the use of an induction coil and states that, with such a coil, the maximum frequency should be 35–50 MHz. Lower frequency power supplies are deemed preferable since they typically cost substantially less than higher frequency generators; however, the use of lower frequencies usually requires a higher volume of susceptor material than would be required at higher frequencies. Therefore, use of a lower frequency generator results in higher loading of the susceptor material in a CBM, which can reduce the strength of the CBM and adversely affect the fusion bonded seal. It is further inadvisable to use lower frequencies for fusion bonding to telecommunications cables since these cables have metallic components (sheaths in copper cables, steel strengthening strands in fiber optic duct) which couple to the magnetic field portion of the inductive energy, whereby the metal component heats up sufficiently to cause damage to the cable or the wires/fibers therein, and also wastes energy.

Energy consumption is important for field splicing and repair since power sources may be limited. Similarly, the power supply and applicator should be portable, as lightweight as possible, and rugged. Conventional power supplies and applicators are not well-suited for use in the splicing and repair of cables and closures, in that they are generally bulky and heavy, and do not have the appropriate geometry for sealing cables. There are further no suitable applicators for higher frequency ranges. It would, therefore, be desirable to devise a system to efficiently couple electromagnetic energy into absorptive materials and allow the materials to be heated and bonded with less electromagnetic power than is required by more conventional means, particularly at higher frequencies. The power supply and applicator should be portable (i.e., not too bulky or heavy) to allow ease of use in field splicing and repair of telecommunications cables. It would be further advantageous if the system could seal surfaces of various shapes and sizes, and be able to seal around a cable or closure without having access to the end of the cable. The applicator construction and operation should also be amenable to applicable safety regulations

SUMMARY OF THE INVENTION

The present invention provides an induction heating system for fusion bonding of telecommunications cables and closures, generally comprising (i) a composite bonding material (CBM) having a bonding matrix and a plurality of susceptors, said susceptors being magnetically reactive at a frequency above 50 MHz, and (ii) applicator means for applying radiant electromagnetic energy to said composite bonding material at a frequency greater than 50 MHz, such that the susceptors may be heated sufficiently to melt a portion of the bonding matrix. Preferably, the susceptors are magnetically reactive in the range of 75–500 MHz, and said applicator means applies radiant electromagnetic energy in the range of 75–500 MHz. The applicator most preferably applies energy at a peak frequency of about 125 MHz.

In one embodiment, the applicator includes an elongate, coaxial quarter-wave resonator having an inner conductor, and an outer conductor at least partially surrounding the inner conductor, the inner and outer conductors being shorted at one end of the resonator, and the inner and outer conductors being constructed such that material containing the susceptors may be interposed between the inner and outer conductors. The inner conductor may comprise an electrically conductive tube located within an electrically conductive outer shield (the outer conductor). A coaxial connector is provided to connect the resonator to the power supply, through a capacitive probe coupling electromagnetic energy to the inner resonator tube, the capacitive probe being connected to a center conductor of the coaxial connector, and the outer tube (shield) being connected to a ground conductor of the coaxial connector. Dielectric material may fill the space between the capacitive probe and the inner resonator tube, as well as the space between the inner tube and the outer tube (shield).

The applicator may be selected from a plurality of applicators each adapted to receive power from the same power supply, and each having a different geometry for heating the CBM, i.e., for accommodating differently shaped thermoplastic articles to be bonded. Alternatively, the applicator may be constructed of an applicator base and a heating adapter operatively connected to said applicator base, the heating adapter being selected from a plurality of heating adapters each having a different geometry for heating the CBM.

In an alternative embodiment of the applicator, the two resonator tubes are electrically connected by a coil which may be shaped to encompass the item or region to be heated. This coil may be comprised of a single conductor strip or of a plurality of wires, electrically insulated from one another, each forming a coil with a common axis, each of the wires being electrically connected in parallel at each end. Several of the wires may further be stacked to form multiple layers of coils, such that the effective resistance of the applicator is reduced and the current-carrying capacity is increased. A plurality of capacitors spaced at selected intervals may also be connected, individually, in series with a respective one of said coils, such that current in the coils is approximately uniform for coil circumferences which are greater than about 0.1 of the wavelength of the radiant electromagnetic energy.

The foregoing system efficiently couples electromagnetic energy into the bonding materials with less electromagnetic power than is required by more conventional means, and accomplishes this at a higher frequency, avoiding the problems associated with induction heating of telecommunications cables at lower frequencies. This also reduces the size, weight and cost of the electromagnetic power generator and makes it more amenable to portable operation where the availability of primary power is limited. In addition the requirement for less electromagnetic power improves the safety of such heaters by inherently reducing the electromagnetic fields to which an operator may be exposed and similarly reduces the potential of interference to other services using the same electromagnetic frequencies. Additional features of the present invention include: (1) the suitability to efficiently heat and bond materials of linear, curved, circular and other configurations; (2) the capability to make seals around and between materials of extended lengths without requiring access to the end of the material; (3) a heating zone of restricted and controlled volume and of a shape and size compatible with the material to be bonded; (4) adaptability to the heating of absorptive dielectric materials in the electric field region of an electromagnetic field or the heating of magnetically absorptive or resistive materials in the magnetic field region; and (5) compatibility of the applicator design with appropriate shielding to minimize electromagnetic field emissions outside the heater device.

BRIEF DESCRIPTION OF THE DRAWINGS

The invention will best be understood by reference to the accompanying drawings, wherein:

FIGS. 3A, 3B, 3C and 3D are elevational views, shown in section, of another embodiment of the quarter-wave cavity applicator of the present inventions, with differently-shaped heating adapters;

DESCRIPTION OF THE PREFERRED EMBODIMENT

The present invention is directed to a method and system for induction heating, particularly for fusion bonding of thermoplastic polyolefins, and essentially comprises (i) an applicator for providing radiant electromagnetic energy, and (ii) a composite bonding material (CBM) having a bonding matrix and a plurality of susceptors which are magnetically reactive. The susceptors are selected to be efficient at very high frequencies, greater than 50 MHz, preferably in the range of 75–500 MHz. The applicator accordingly is designed to optimize energy output in these ranges, and most preferably at peak frequency of about 125 MHz.

Figure 1:
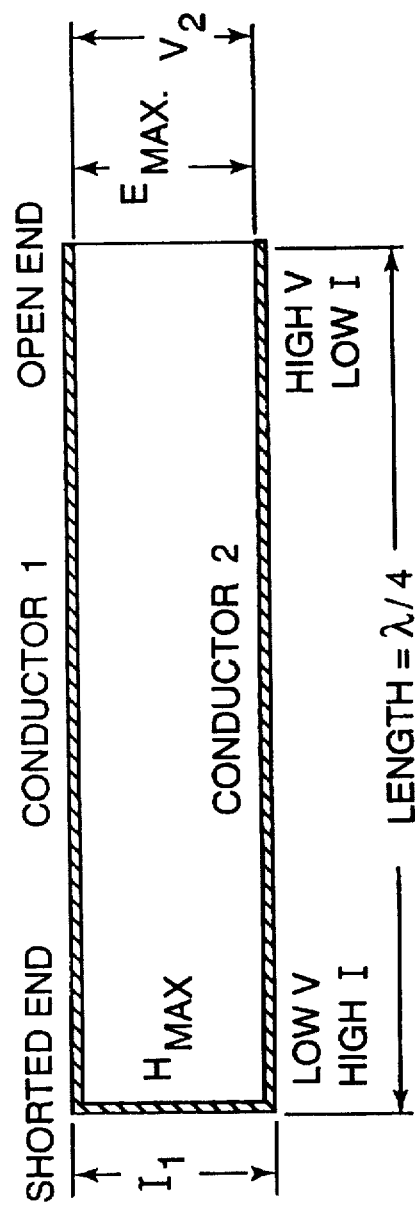
FIG. 1 is an elevational view of a conventional two-conductor, quarter-wave cavity.

In one embodiment, the applicator of the present invention adapts the properties of a quarter-wave resonator. A length of two-conductor electrical transmission line that is shorted (low resistance connection from one conductor to the other) at one end and open at the other, as illustrated in FIG. 1, will be resonant at frequencies having a quarter-wavelength (or odd multiples thereof) approximately equal to the effective length of the line. At these resonant frequencies the line will have a (near) zero impedance at the shorted end and a very high impedance at the open end. As a consequence, when appropriately connected to an electromagnetic power source, of a frequency corresponding to the quarter-wavelength resonance, there will be, at the shorted end of the line, near zero voltage between the two conductors and a very high current flowing in the conductors. Toward the open end of the line the voltage across the line increases and the current flow in the conductors decreases such that at the open end the current flow is essentially zero and the voltage between the conductors is at a maximum.

The quality of a resonator is defined by the "Q," which is a ratio of the energy stored to the energy dissipated per cycle of the electromagnetic field. The amount of voltage at the open end, and the current at the shorted end, are proportional to: (1) the power, P, that is coupled from the electromagnetic source into the resonator and (2) the respective impedances at the two ends, such that $P=E^2/Z_1=I^2Z_2$ where E is the electric field strength at the open end, $Z_1$ is the electrical impedance between conductors at the open end, $Z_2$ is the effective impedance of the shorted end and I is the current at the shorted end. These impedances are functions of the configuration of the transmission line and the Q which is affected by the resistive loss of power in the conductors, the dielectric loss of power in the insulating media between the conductors, the power lost by radiation and the power loss in absorptive material being heated by the resonator fields. For efficient heating of materials the power loss in these materials should be as large a portion of the total power loss as can be achieved. This then implies that the Q of the resonator, without considering the effects of the material to be heated, should be as high as can be achieved within the restrictions imposed by other requirements and the material to be heated should cause as large a reduction in the Q as can be achieved, i.e. the power absorbed from the resonator by the material to be heated should be maximized. The applicator of the present invention addresses these issues.

The heating of magnetic and conductive materials in a time varying magnetic field is a function of the magnetic field intensity (H), the hysteresis loss characteristics, the eddy current loss characteristics and the frequency of the time varying field. The total power lost, $P_r$, from the field to such materials is $$P_r = P_h + P_e$$

where:

$P_h$=hysteresis loss, watts, $\propto BfvA_{BH}$, $P_e$=eddy current loss, watts, $\propto f^2B^2v$, B=magnetic flux density in the material=$\mu H$, $\mu$=relative permeability of the material, H=magnetic field intensity, f=frequency of H field, v=volume of material, and $A_{BH}$=area of B-H curve of magnetic material, for field intensity of H.

For non-conductive magnetic materials only the hysteresis loss causes the material to be heated as a result of power absorbed from an electromagnetic field. Since the H field is proportional to the current flowing in a conductor, the highest field in the quarter-wave resonator is at the shorted end of the line. Similar analysis of the electric field shows that dielectric heating can be maximized at the open end of the line.

Figure 2A:
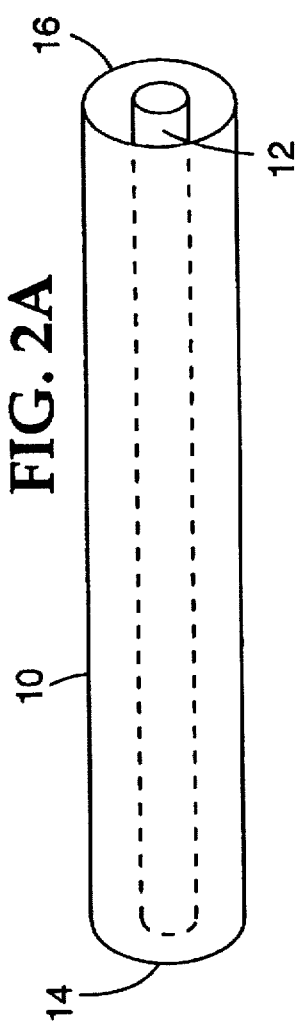
FIGS. 2A and 2B are perspective views of coaxial, quarter-wave cavities used as applicators of inductively coupled energy, according to the present invention.
Figure 2B:
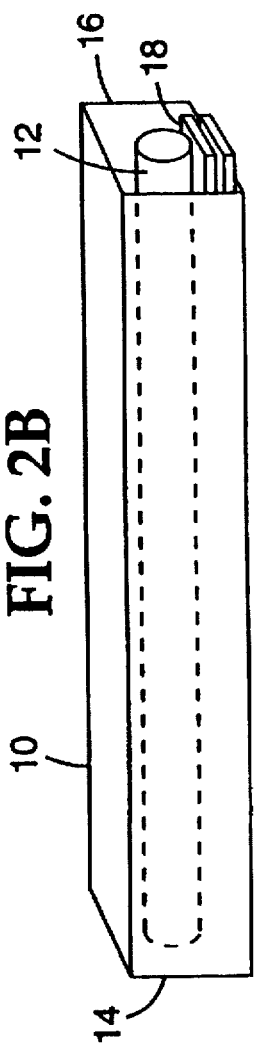

The current I which generates the H field is a function of the Q of the resonator and the characteristic impedance, $Z_0$. A higher Q resonator results in increased E and H fields for a given amount of electromagnetic power coupled into the resonator. In addition, the current is an inverse function of $Z_0$, while the voltage is a direct function of this parameter. To maximize the Q the power lost or dissipated per cycle, except that lost to the material being heated, should be minimized. To minimize radiation losses this objective is best met by using an enclosed (shielded) resonator design similar to a coaxial transmission line, as shown in FIGS. 2A and 2B, or similar to a cavity resonator using waveguide techniques. The resonator Q is also increased by minimizing resistive losses in the conductors through the use of low resistivity materials having a maximum cross-sectional area and low resistance joints or connections between metal components. Similarly, any dielectric or insulating materials used in the resonator structure should have a minimum dissipation factor at the selected operating frequency. Forming the conductors at the shorted end of the resonator to enclose the volume of magnetic material to be heated provides a region where maximum heating of this type material is obtained.

The applicator embodiments of FIGS. 2, 3 and 4 are based on a quarter-wavelength coaxial resonator that is shorted at one end and open at the other. These applicators have an outer conductor 10 which forms a shield around an inner conductor 12. A low resistance electrical conductor (a continuation of the shield), joins 10 to 12 at shorted end 14, preferably continuous around the shorted end 14, and outer conductor 10 may also enclose open end 16 but is not electrically connected to center conductor 12 at open end 16. The shape of outer conductor/shield 10 may be round (FIG. 2A), square (FIG. 2B) or other configuration. Magnetically absorptive material 18 to be heated is located between the two conductors near the shorted end of the line. Holes or slots may be provided through the outer conductor near shorted end 14 to allow insertion of dielectrically reactive material, to be heated in the region between the conductors adjacent the shorted end. Center conductor 12 may be formed into a half loop or other shape to fit around material to be heated and thereby concentrate the field in the selected region. Electromagnetic power from an external generator is coupled into the resonator by use of a capacitive probe at, or near, the open end, by a inductive loop at, or near, the shorted end, or by a direct electrical connection to the center conductor.

The quarter-wave resonator must have an effective electrical length that is a quarter-wavelength long at the operating frequency. The physical length may be made much shorter than the effective electrical wavelength by appropriate use of capacitive or inductive loading as is known, or by using an insulating material of high dielectric constant between the two conductors. The high dielectric constant material reduces the velocity of the electromagnetic wave in the resonator in proportion to the square root of the dielectric constant of the material. By filling the space between conductors with a material having a relative dielectric constant of 4, for example, the physical length of the resonator for a given frequency can be (nominally) reduced to half that of an air-filled resonator. The material of high dielectric constant also reduces $Z_0$. These properties are used advantageously in the present invention to reduce the physical size and to increase, for a given amount of power, the current and the resulting 1t field in which magnetic materials are heated (and can also be used to control the E field).

The embodiments of FIGS. 2, 3 and 4 also have an advantage over induction coils (multi-turn wire windings) in that they allow better control of the volume of material to be heated, and they may be fabricated in the form of an openable clamp to allow heating of the thin layer on the periphery of a selected length of material without requiring access to the end of the material. For example, the resonator can be readily made to rapidly clamp around the circumference of an extended length of cable rather than having to pass the cable through an induction coil. FIG. 3 shows one embodiment of the invention for clamping around and heating magnetically absorptive materials and welding such materials to adjacent materials. FIG. 4 shows a second embodiment for heating lengths of magnetically absorptive materials.

FIG. 3 shows preferred embodiments of the invention for clamping around and heating material in the peripheral region of single or multiple cables or closures (FIGS. 3A, 3B, and 3C) or for heating flat strips of material (FIG. 3D). The material (discussed further below) may be of a sandwich configuration with the inner materials being magnetically absorptive at the frequency of the resonator and the outer materials being either absorptive or non-absorptive. The heating of one or more layers can be sufficient to cause the materials, or portions thereof, to reach the melting or fusion point such that the layers become bonded one to the other. Many plastic materials, particularly those of polyethylene, may be welded together in this manner if one or more layers, by use of appropriate additives, are made magnetically absorptive to electromagnetic energy of the resonator frequency. Such additives may be particles or filaments of materials exhibiting hysteresis loss or thin films of resistive materials or materials which modify the bulk resistivity or conductive characteristics of the layer.

The applicator 20 of FIG. 3A is a quarter-wave resonator with means for coupling electromagnetic power through a capacitive probe 22 at the open end 24 of the resonator's inner conductor. In this embodiment, several components make up the inner conductor, including resonator tube 26, coupling joint 28 and low resistance conductor 30. The outer conductor is also formed of several parts, including another low resistance conductor 32 and a shield formed of a first housing 34 which surrounds resonator tube 26 and a second housing 36 which surrounds low resistance conductors 30 and 32. Probe 22 is connected to the center conductor of a coaxial cable connector 38. A coaxial cable (not shown) from connector 38 leads to an electromagnetic signal source (power supply) 40 which provides an appropriate amount of power at the resonator frequency (discussed further below). Resonator tube 26 surrounds, or is adjacent to, coupling probe 22 to form a coupling capacitance that causes the resonator input impedance at connector 38 to be of a selected value. Typically this input impedance is made to match that of the coaxial cable used to carry electromagnetic (EM) power from source 40 but it may be made a different value to s directly match a closely adjacent generator, amplifier, oscillator or other component. Providing an input impedance of 50 ohms or less allows the use of a longer coaxial cable without significant loss. Another probe 42 which is electrically connected to a connector 44, also forms a capacitive coupling to resonator tube 26 and may be used to provide a sample of the resonator energy as an output for purposes of monitoring the resonant power level, indicating proper tuning of the resonator to the EM wave source or for feedback to the input of an electronic amplifier to cause it to self oscillate and become the EM power source at the resonator frequency when the output of the amplifier is connected to resonator input coupling probe 22.

Low resistance conductor 30 is removably attached to resonator tube 26 by a low resistance detachable connection 46 at coupling joint 28 to form a continuation of the center conductor to the shorted end 48. Low resistance conductor 32 is electrically connected to conductor 30 and housing 36 by a metallic element 50, and is further connected to housing 36 at the extended interface 52 to form a part of the outer conductor and carry a major part of the EM resonator current flowing in the conductors in the region near shorted end 48. The adjacent surfaces of 32 and 36 are shaped to best conform to the material 54 to be heated. Several shapes for elements 32 and 36 for heating round or flat material are illustrated in FIG. 2. Material 54 may be heated even though that material may not completely fill all the region available for the material. The center region of the round shapes in FIGS. 3A, 3B and 3C may also be heated but not at the same rate as the material at the periphery of the regions. The outer conductor components 34 and 36 separate at 56, and components 26 and 30 of the center conductor are hinged at shorted end 48, allowing separation of 30 and 32 to permit material 54 to be placed in the region or to allow the heater to be placed around material to be heated and then removed. Other hinging and separation configurations to permit the heater to be placed and clamped around various forms of material to be heated will become apparent to those skilled in the art upon reference to this disclosure.

The configuration of FIG. 2A makes use of a single metal element 50 to serve as the electrical short between the inner and outer conductors, as well as the hinge. In the configuration of FIG. 3B, the electrical short across 30 and 32 is electrically isolated from the shield (housing 36) which forms the outer conductor of the resonator such that the high EM current does not flow through the external hinge 58. This construction provides better shielding and reduces electromagnetic emissions from the heater. In the configurations of FIGS. 3C and 3D, low resistance conductor 32 is shaped to electrically isolate this conductor from the shield at the high current (shorted) end of the resonator to better equalize the current flow and heating of the material 54 from such currents in elements 30 and 32, and to further reduce currents in the shield to minimize emission fields. The adjacent surfaces of components 32 and 36 (such as at 52) in any of the resonator embodiments of FIGS. 3A, 3B, 3C or 3D may be shaped to conform to any of the material geometries as shown in any of these Figures or any other shape as may be appropriate for heating magnetically absorptive materials. Dielectric material 60 between the inner and outer conductors 26 and 34 provides electrical insulation to minimize high voltage breakdown effects at the open end of the resonator, serves to reduce the velocity of EM wave propagation in the resonator, thereby reducing the required physical length of the resonator for a selected frequency, and may increase the current flow and the heating effect therefrom at the shorted end of the line by reducing the characteristic impedance, $Z_0$, of the transmission line element which forms the resonator. Dielectric material 60 may extend over the entire length of the resonator or over only a portion as shown in FIG. 3, and may fill all or only a portion of the space between the conductors. The dielectric material is selected to have a minimum of dielectric loss to aid in maintaining a high resonator Q and to have a relative dielectric constant as required to optimize the physical size and $Z_0$ of the resonator. Coupling probe 22 is electrically insulated from resonator tube 26 by additional dielectric material 62. This dielectric must be of low loss material to minimize adverse effects on the Q of the resonator and may be of the same material as 60 or different.

FIG. 3 further illustrates how different heating adapters (components 30, 32, 36) may be attached, one at a time, to a common applicator base (components 22, 26, 28, 34). Even if completely separate applicators were provided, they could still use a common power supply 40.

A continuous strap of conductive material (not shown) may be used in place of elements 30, 32 and 50 to form a loop around material to be heated. This strap would preferably be connected at 46 to 28 and at 64 to 34 to provide the electrical requirements for a shorted end and the remaining length (inductance) needed to form a quarter-wave resonator at the desired frequency. Means to adjust the length of the loop formed by the conductor and thereby control the tension may be incorporated. Such means may be as simple as a slot in the strap under the attachment 46, a clamp through which the strap passes, or a threaded screw mechanism.

Figure 4A:
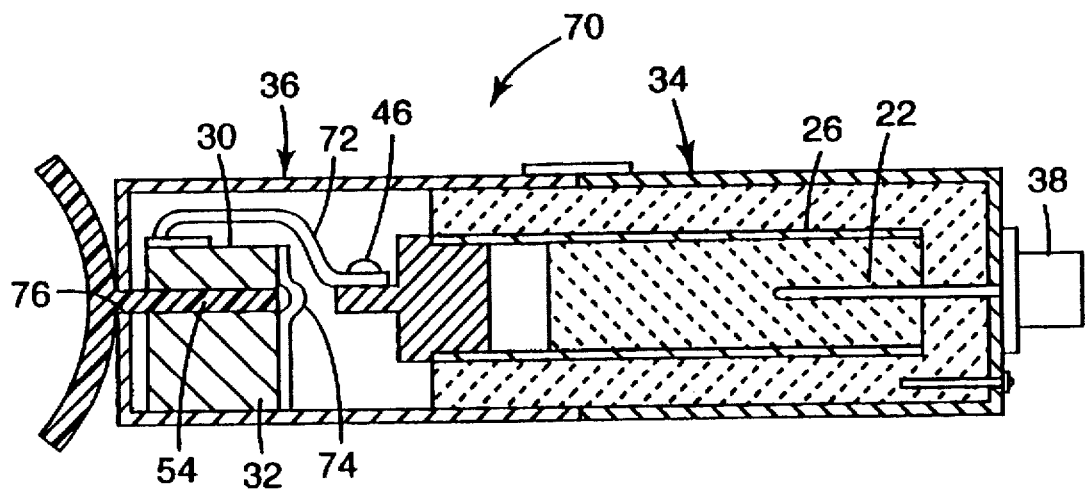
FIGS. 4A and 4B are side elevational and top plan views, respectively, of still another embodiment of the quarter-wave cavity applicator of the present invention, adapted for use in sealing longitudinal flanges.
Figure 4B:
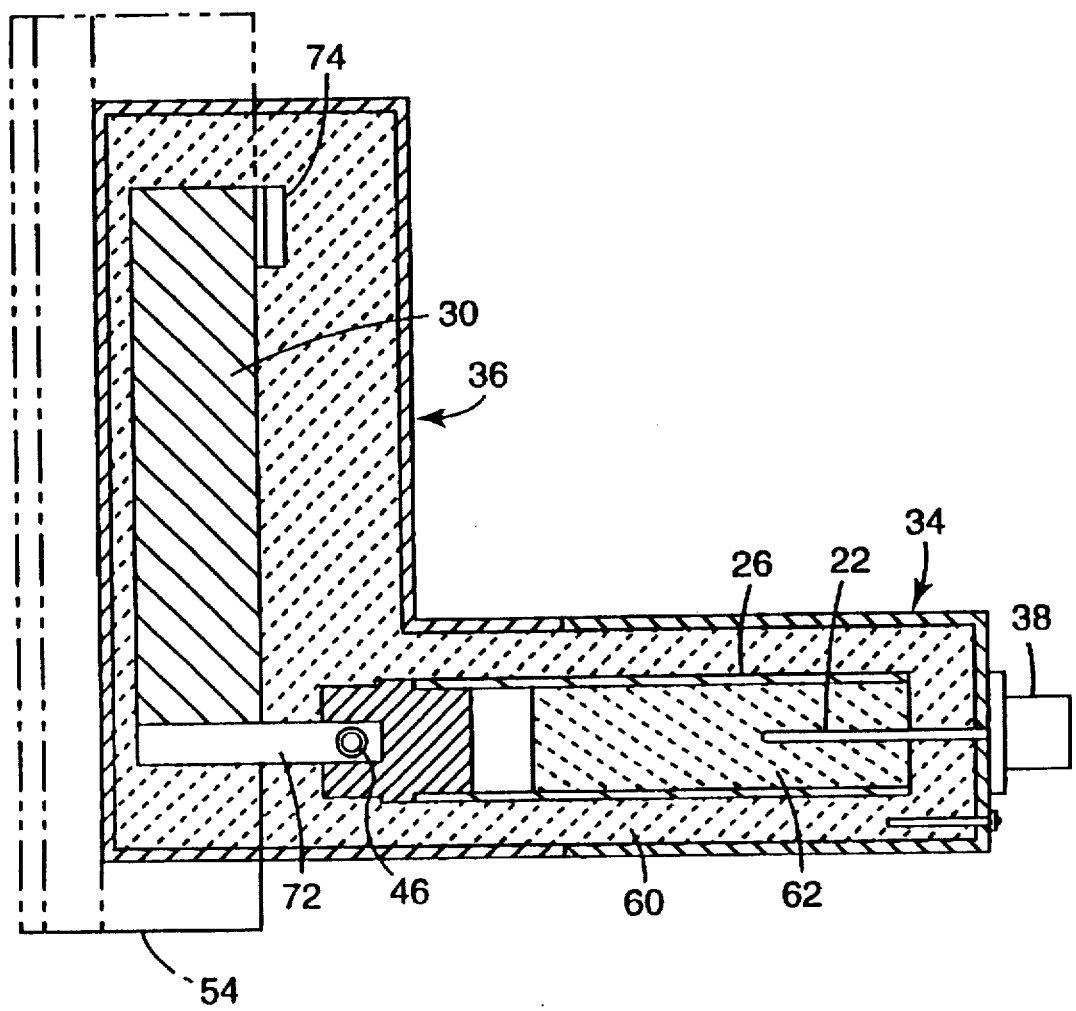

FIGS. 4A and 4B show an adaptation 70 of the quarter-wave resonator most suited for heating extended lengths of materials that are magnetically reactive at the resonator frequency. A conductor 72 joins resonator tube 26 to conductor 30 to form a continuation of the inner conductor of the resonator. Conductive element 32 is connected through to shield 36 to form a continuation of the outer conductor. Another low resistance element 74 forms an electrical short between the two conductive elements 30 and 32. The material 54 to be heated is located between the adjacent surfaces of 30 and 32 where the high EM current of the resonator heater produces a maximum EM field. The edge of the material to be heated is inserted through a slot 76 along one side of housing 36, extending into the region between the conductors 30 and 32. Slots in the adjacent ends of the shield allow extended lengths of material to slide through the conductors 30 and 32 as illustrated in FIG. 4B, useful in accommodating, e.g., longitudinal flanges of cable closures. The assembly of the extended portion of the applicator (components 30, 32, 36, 72 and 74 in FIG. 4) may be made separable from the other elements of FIG. 4 or it may be an integral part thereof.

Power supply 40 is a radio frequency power generator which operates at the resonator frequency, and can run off 12 v DC as well as 110/220 v AC. The resonator frequency is selected to be optimum for the particular application, in the range of 50–1000 MHz. The power generator frequency is preferably locked to the resonator frequency by use of a feedback connection. In the present embodiment, wherein the applicators are sized for sealing telecommunications cables and closures, the optimum frequency is 125 MHz. The power from the generator is optimized for the size and extent of the fusion bond. The power supply, as well as the applicator, should comply with all applicable regulatory requirements, as well as industrial standards such as ANSI/IEEE standard C95.1-1992, "Safety Levels with Respect to Human Exposure to Radio Frequency Electromagnetic Fields, 3 kHz to 300 GHz."

Figure 5:
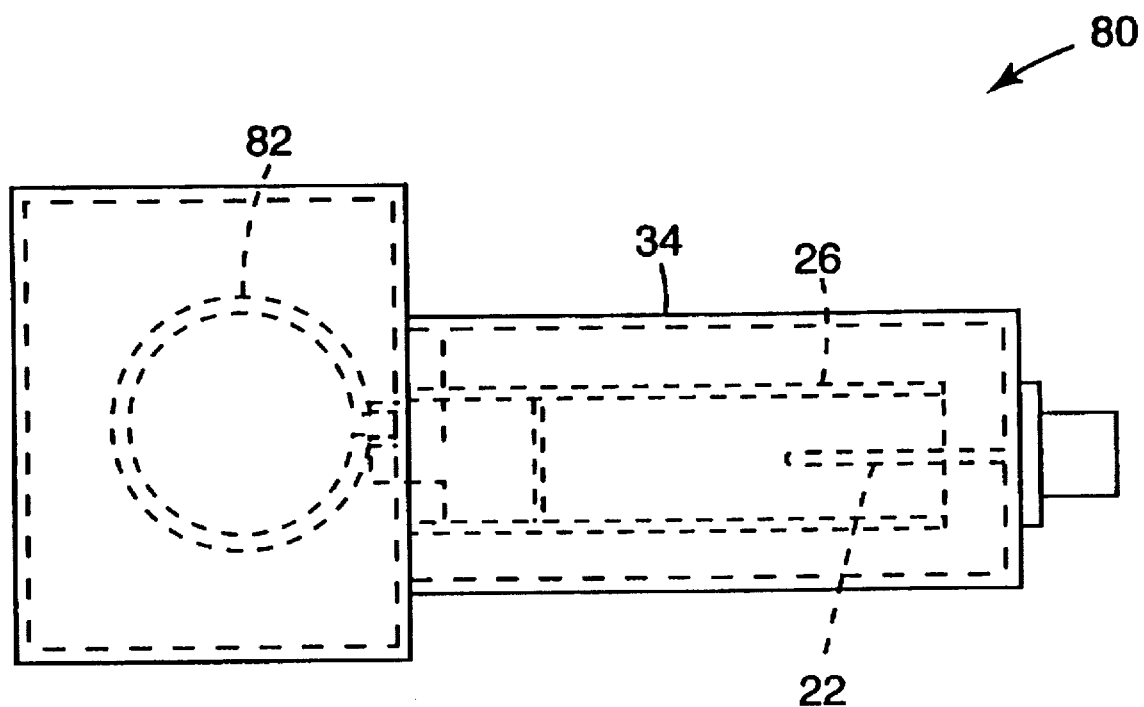
FIG. 5 is a perspective view of an alternative embodiment of the applicator used in the present invention.

An alternative applicator design 80 is depicted in FIG. 5, and also provides means of improved efficiency in producing a very high frequency, high intensity alternating electromagnetic field. Applicator 80 exhibits reduced power loss in the inductive coupling element (a coil 82) and thereby permits generation of a higher magnetic field intensity for a given amount of high frequency power, and also reduces resistance losses and the heating of the coil by the high frequency current flowing therein. A variation of the heater coil design allows the use of higher frequencies than would otherwise be possible for efficient heating of material of large diameters.

The electromagnetic field in a generalized coil is proportional to the current, I, flowing in the conductor. The power dissipated in the coil is equal to $I^2R$, where R is the effective resistance of the length of conductor forming the coil. At low frequencies this resistance is given by $$R = \rho L/A$$

where:

A = cross-sectional area of the conductor,

L = length of the conductor, and $\rho$ = resistivity of the conductor.

For a copper wire 0.25" (6 mm) in diameter and one-foot long, the cross-sectional area is 0.049 square inches (31 sq. mm) and resistance would be near $1.71 \times 10^{-4}$ ohms at DC and at very low AC frequencies. A current of 100 amperes flowing in the wire to produce a magnetic field would cause a power dissipation of 1.71 watts in the wire. However, as is well known, at higher frequencies the skin depth effect restricts the effective cross-sectional area such that most of the current must flow in a very thin region near the surface of the conductor. This increases the effective resistance and the power required to force a given current through the wire. At 100 MHz, for example, the skin depth for copper is $3.5 \times 10^{-4}$ inches and the effective resistance of the same 0.25"diameter, one-foot long wire increases by a factor of 233, to 0.3988 ohms/foot. For a current of 100 amperes the power dissipation becomes 398.8 watts! This will cause the wire to become very hot which further increases the resistance and power in a vicious cycle, and which can lead to excessive thermal heating of material near the wire surface.

The alternative design of applicator 80 uses a multiplicity of smaller diameter wires in parallel to effectively increase the conducting cross section at high frequencies for a given total conductor cross-sectional area. The skin depth for small diameter wires is approximately equal to that of large diameter wires but for small wires the percentage of the physical cross sectional area that carries high frequency currents is much higher. For example a 0.25"diameter solid wire has a cross section area of 0.049 square inches but at 100 MHz the effective current-carrying cross-sectional area is 0.049/233, or $2.1 \times 10^{-4}$ square inches. A bundle of 1000 wires each of $7.89 \times 10^{-3}$ diameter would have the same total cross sectional area, but if the wires are adequately separated the effective current-carrying cross-sectional area at 100 MHz will be $8.69 \times 10^{-3}$. This is 41 times that of the solid 0.25"diameter solid conductor, and the effective resistance is thus reduced by a factor of 41. For 100 amperes of current this reduces the power dissipation in the conductor from 398.8 watts to 9.7 watts.

A coil formed of a strip of copper, or other conductor may be used in an attempt to produce a more uniform H field of greater extent along the width and near the conductor. This is frequently needed to produce uniform heating in a wide area of material which absorbed energy from the H-component of an electromagnetic field. With a wide conductor strip carrying current perpendicular to the width, the current density is not uniform across the width but is more intense near the edge. This causes the H-field intensity to be higher near the edges of the conductor and lower in the midregion. Uniformity of the current distribution can be improved and with lower effective resistance as previously described by use of a multiplicity of parallel conductors of smaller width. These conductors are physically located side by side and insulated one from the other except for being electrically connected in parallel at the ends to form a layer of conductors of a desired overall width. These layers may be stacked to further reduce the effective resistance and thereby increase the current carrying capacity and reduce the power dissipation for a given flow.

The described layer of parallel conductors which form a conductive strap-type coil of desired width may be formed by etching copper clad boards to provide the desired pattern of conductors on the one or both sides of the insulating substrate. The thickness of the etched cladding and the width of the individual conductors should preferably be somewhat greater than twice the skin depth for the frequency of the current to be used to produce an electromagnetic field, using the strap conductor to form a full or partial coil. The spacing from conductor to conductor should be the minimum that allows adjacent conductors to mutually carry current with a minimum reduction in the effective skin depth from the effects of the other.

For example, etched parallel conductors each 0.006 inches wide, spaced 0.012 inches center-to-center, and 0.0015 inches thick have been used to form a strap conductor of about 0.500 to 0.75 inches total width. The number of parallel conductors ranged from 42–63. The insulating substrates have ranged from 0.005 to 0.062 inches in thickness and have included fiberglass, Teflon, reinforced Teflon, and polyamide materials. This list of conductor, substrate materials and dimensions is not exhaustive and others are potentially usable. Through plated holes between conductors on each side of the substrate may be used to provide electrical connections at the ends or at other points as desired. The ends of all the conductors are electrically connected in parallel by a wider region of conductor which also provides means for connection of the strip to the remainder of the circuit and to the generator used to provide RF power through the coil.

The multiwire coil may be connected to a short section of coaxial RF transmission line as previously describe for the resonator comprised of an inner tube and an outer tube to which RF power is coupled through a capacitive probe, or to a suitable capacitor to form a high Q electrical resonator tuned to the desired operating frequency. Suitable impedance matching may be included to allow maximum transfer power from an RF generator to the resonator to maximize the efficiency with which available RF power is used. The coil is preferably enclosed in a shield (full or partial) to minimize the external electromagnetic field and to minimize the radiated power and thereby improve the efficiency of generating a high intensity RF magnetic field within or near the coil.

Many materials which may be heated by exposure to the H-component of an electromagnetic wave are more absorptive at higher frequencies than at lower frequencies. For this reason it is desirable to use as high a frequency as possible to produce the desired heating rate with minimum amount of RF power. However, it is also desirable that the heating be uniform along the full extent of material to be heated by use of the RF field. With a coil formed of a continuous conductor that is fed an RF current, the field will vary along the conductor length as a function of wavelength. Thus the coil circumference must be a small fraction of a wavelength, typically 0.1 wavelength or less, at the RF frequency at which it is to be used. This then sets a limit as to the maximum size of material that may be uniformly heated at a selected frequency. For example, if the material heating properties require a minimum frequency of 400 MHz (wavelength of 0.75 meters) then the largest coil circumference which may be used and still keep the conductor length to less than 0.1 wavelength is 0.075 meters (2.955") making the maximum coil diameter 0.94". This limits the maximum diameter of material to be uniformly heated to less than 0.94 inches.

This restriction may be overcome and larger sections of material heated at a selected frequency by putting one or more capacitors in series with the conductor; in this manner, the current can be kept more uniform over coil circumferences that are much greater portions of a wavelength. The length of the conductor forming a coil is divided into multiple segments with each segment made a small fraction of a wavelength (i.e., 0.1 wavelength or less). A capacitor is placed between adjacent segments to correct the phase of the current or to partially tune out the effective inductive reactance of the coil conductor segments. By use of an appropriate capacitance between segments, the RF current flow from segment to segment is kept nearly in-phase and of near uniform amplitude. This allows uniform heating of much larger sections of material than would otherwise be possible at a selected very high RF frequency. These capacitors may preferably be formed by etched patterns of conductors on both sides of an insulating substrate, but could be discrete capacitors of adequate current capacity, voltage rating, loss resistance and stability. The area of the overlap of conductors on each side of an insulating substrate and the thickness and dielectric constant of the substrate sets, to a first order, the value of the capacitance so formed as is well known for parallel plate capacitors. Wavelength effects may need to be considered for higher accuracy determinations. The substrate material should have low dielectric loss and good high-voltage breakdown properties. Teflon-based materials have been found suitable for some applications though other substrate materials can be used. The etched parallel plate capacitors can be combined with the conductors that form the coil segments and an appropriate pattern etched simultaneously in the double clad board to form the coil strap of a desired length. The coil segments and overlap to form the capacitors can be of the parallel multi-conductor configuration previously described or made of a wider strip. Other means of fabrication can also be used within the scope of this invention. Applicator 80 may use the same power supply 40 used with applicator 20

The composite bonding material (CBM) used with the present invention comprises a bonding matrix with a plurality of magnetically reactive susceptors therein. The bonding matrix can be a cohesive material (thermoplastic, such as polyethylene) or an adhesive material (epoxy or hot-melt) or a mixture thereof. Simple susceptors such as ferrite powder may be used. A preferred material is the layered, magnetic particles described in U.S. patent application Ser. No. 08/412,966 filed on Mar. 29, 1995. These multi-layered flakes include at least one thin-film, crystalline, ferromagnetic metal layer stacked alternately with at least one thin-film dielectric layer, and are present in the bonding matrix in an amount in the approximate range of 0.1% to 10% by volume. The composition of the CBM is generally not critical and is not per se within the scope of this invention; however, the CBM must be reactive at the applicator frequency. The bonding matrix or susceptors could also have a material which has a dielectric reactance. Finally, the susceptors could be self-regulating, i.e., Curie-limiting.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A system for fusion bonding via electromagnetic heating in the H-field, comprising:

a composite bonding material having a bonding matrix and a plurality of susceptors, said susceptors being magnetically reactive at a frequency of from above 50 MHz to less than or equal to about 1000MH;

applicator means for applying radiant electromagnetic energy to said composite bonding material at a frequency of from above 50 MHz to less than or equal to about 1000MHz, such that said susceptors may be heated sufficiently to melt a portion of said bonding matrix;

said applicator means including a plurality of wires, electrically insulated from one another, each forming a coil with a common axis, each of said wires being electrically connected in parallel, wherein several of said plurality of wires are stacked to form multiple layers of said coils, such that the effective resistance of said applicator is reduced and the current-carrying capacity is increased; and a plurality of capacitors, each connected in series with a respective one of said wire coils, such that current in said coils is approximately uniform for coil circumferences which are greater than 0.1 of the wavelength of said radiant electromagnetic energy.

2. An apparatus for applying radiant electromagnetic energy to magnetically reactive susceptors, the apparatus comprising:

an elongate inner conductor;

an elongate outer conductor at least partially surrounding said inner conductor and extending generally parallel thereto;

said inner and outer conductors being electrically connected at a common end by a plurality of wires to form a quarter-wave resonator, said plurality of wires electrically insulated from one another, electrically connected in parallel, and forming a coil with a common axis;

said inner and outer conductors being constructed such that material containing the susceptors may be interposed between said inner and outer conductors; and means attached to said inner and outer conductors for electrically connecting said conductors to an external power supply.

3. The apparatus of claim 2 wherein:

the susceptors are magnetically reactive in the range of 75–500 MHz; and said apparatus is adapted to radiate inductive energy in the range of 75–500 MHz.

4. The apparatus of claim 2 wherein said connecting means comprises a coaxial connector, a center conductor of said coaxial connector being coupled to said inner conductor, and a ground conductor of said coaxial connector being connected to said outer conductor.

5. The apparatus of claim 2 further comprising a capacitive probe for coupling electromagnetic energy to said inner conductor.

6. The apparatus of claim 2 wherein said inner conductor includes a resonator tube, and further comprising capacitive probe means for coupling electromagnetic energy to said resonator tube.

7. The apparatus of claim 2 further comprising probe means for sampling resonator energy at said inner conductor.

8. A system for applying radiant electromagnetic energy to magnetically reactive susceptors, the system comprising:

a power supply; and applicator means for electromagnetically heating in the H-field the susceptors, said applicator means including (i) an applicator base having means for electrically connecting said base to an external power supply, and (ii) a heating adapter operatively connected to said applicator base, said heating adapter being selected from a plurality of heating adapters each having a different geometry for heating differently shaped materials containing the susceptors;

said applicator base and a given one of said heating adapters together forming a quarter-wave resonator.

9. The system of claim 8 wherein said applicator base includes an electrically conductive resonator tube located within an electrically conductive outer shield.

10. The system of claim 9 wherein said connecting means comprises a coaxial connector, and further comprising a capacitive probe coupling electromagnetic energy to said resonator tube, said capacitive probe being connected to a center conductor of said coaxial connector, and said outer shield being connected to a ground conductor of said coaxial connector.

11. The system of claim 8 wherein at least one of said plurality of heater adapters comprises a plurality of wires, electrically insulated from one another, each of said wires forming a coil with a common axis, and each of said wires being electrically connected in parallel.

12. A system for fusion bonding via electromagnetic heating in the H-field, comprising:
 a composite bonding material having a bonding matrix and a plurality of magnetically reactive susceptors;
 applicator means for applying radiant electromagnetic energy to said composite bonding material such that said susceptors may be heated sufficiently to melt a portion of said bonding matrix, said applicator means including a plurality of wires, electrically insulated from one another, each forming a coil with a common axis, each of said wires being electrically connected in parallel; and
 a plurality of capacitors, each connected in series with a respective one of said wire coils, such that current in said coils is approximately uniform for coil circumferences which are greater than 0.1 of the wavelength of said radiant electromagnetic energy.

13. The system of claim 12 wherein several of said plurality of wires are stacked to form multiple layers of said coils, such that the effective resistance of said applicator is reduced and the current-carrying capacity is increased.

14. The system of claim 12 wherein said applicator means is adapted to radiate electromagnetic H-field energy in the range of 75–500 MHz.

* * * * *